July 17, 1934. R. S. RICHARDSON Re. 19,243
SYNTHETIC PRODUCTION OF BODIES FROM THEIR COMPONENT GASES
Original Filed April 24, 1925
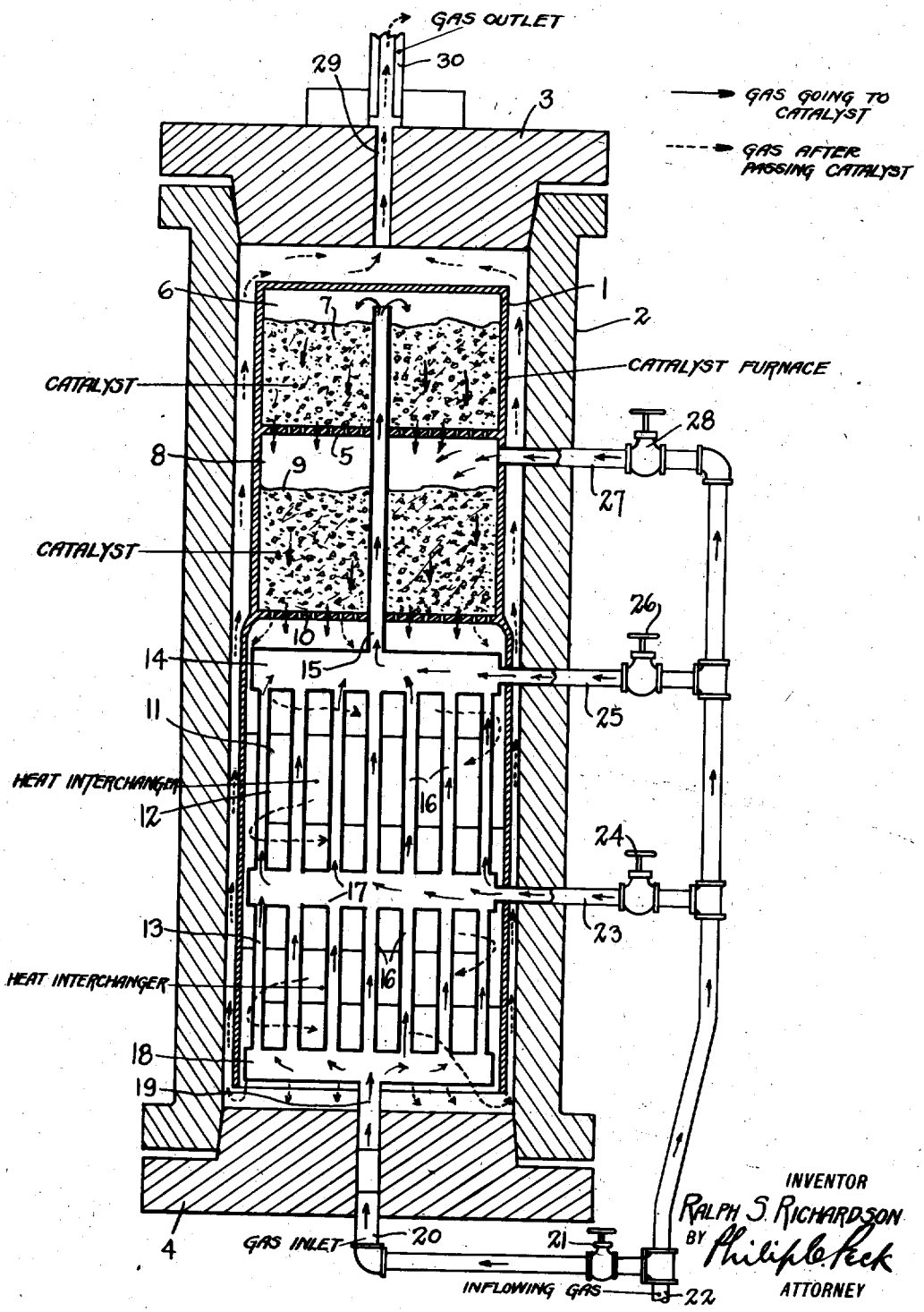

Reissued July 17, 1934

Re. 19,243

UNITED STATES PATENT OFFICE 19,243

SYNTHETIC PRODUCTION OF BODIES FROM THEIR COMPONENT GASES

Ralph S. Richardson, Scarsdale, N. Y., assignor, by mesne assignments, to Chemical Engineering Corporation, New York, N. Y., a corporation of Delaware Original No. 1,704,214, dated March 5, 1929, Serial No. 25,590, April 24, 1925. Application for reissue October 20, 1932, Serial No. 638,834

11 Claims. (Cl. 23—199)

My invention relates broadly to processes for converting given substances into others having different physical or chemical characteristics as through the use of a catalytic agent. More particularly my invention comprises novel processes in the manufacture of valuable products by direct synthesis from their component gases which are passed at high temperatures under pressure over a catalyst mass, as for example, the manufacture of methyl alcohol or methanol ($CH_3.OH$) from carbon monoxide (CO) and hydrogen, or the production of synthetic ammonia ($NH_3$) from a gaseous mixture of nitrogen and hydrogen in their combining proportions. In any instance the elements should be combined in their respective proportions in the gaseous mixture and then compressed to relatively high pressures and passed under such pressure over a suitable catalytic agent capable of stimulating the combination of the two gases whereby sufficient heat is produced to maintain the temperatures required for satisfactory yields.

In the manufacture of methanol from a mixture of one part of carbon monoxide and two parts of hydrogen by volume which is preferably passed under 300 atmospheres pressure and at a high temperature (300° to 400° C.) over a catalyst containing metallic copper and zinc oxide with recirculation of the uncombined gases, success depends almost entirely on the regulation and control of the temperatures maintained within the catalytic chamber.

In the manufacture of synthetic ammonia industrially by passing the purified gas mixture of nitrogen and hydrogen under the high pressures required through a suitable catalyst, preferably reduced iron oxide heated to a high temperature, say 400° C. to 600° C., with recirculation of the uncombined gases through the apparatus, satisfactory production depends largely, if not almost entirely, upon similar control of the temperatures within the catalyst containers.

In industrial operations many difficulties are encountered in maintaining the catalyst at an optimum temperature after being initially heated from within, since variations of such temperature in either direction lowers the conversion efficiency of the catalyst with decreased yields. It has been found that too low temperatures greatly decrease the activity of the catalyst, so that cooling takes place below that required to maintain the reaction, and therefore production of methanol or ammonia ceases entirely. Under ordinary conditions of operation the heat produced in the catalyst chamber is insufficient to maintain the reaction unless the ingoing gas mixture is preheated either directly or by the hot outgoing mixture after conversion through heat-exchange apparatus either separately installed or arranged within the catalyst chamber.

Furthermore in industrial practice on a commercial scale, it has been found that the portion of the catalyst which first comes in contact with the gas mixture where the activity is more intense, may become injured by overheating or even poisoned by impurities in the gases. Even though such heat is removed by suitable cooling surfaces surrounding that portion of the catalyst, yet local over-heating is likely to occur in the catalyst mass. Hence it follows that the maximum life of a catalyst as well as maximum conversion of the synthetic products are largely dependent upon the temperature at which such catalyst operates in producing methanol or ammonia as I have stated.

Heretofore removal of the heat of reaction has been accomplished throughout the catalyst in practice by use of heat transfer surfaces suitably disposed within the catalyst mass, but such system of control inevitably permits great differences in temperature in various isolated parts of the catalyst mass, and especially allows no adequate control of temperature capable of being varied with operating conditions to secure optimum temperatures for maximum conversion.

According to my invention I control the temperature throughout the catalyst mass in varying sections or zones by which the temperature in the major portion which is last to be reached by the proper gaseous mixture is maintained closely to the optimum temperature for maximum methanol or ammonia conversion, since the greater part of the heat generated through the reaction is liberated in the lesser portion of the catalyst mass which initially comes in contact with the gas mixture entering the catalyst furnace. The temperature control may be attained by passing comparatively cool gas at various points within the converter to be circulated therein. Furthermore the temperature in the first section or portion of the catalyst mass is controlled partly by introducing part of the in-flowing gas mixture beyond a portion of the heat-exchange surface usually attached to the catalytic furnace and partly by the transfer of heat from the catalyst itself to the incoming flow of the gas mixture, while the temperature of the second, and preferably the major, portion of the catalyst mass is controlled by the admixture of cooler gas to that superheated gas leaving the first section or portion of the catalyst.

According to another aspect of my invention, the temperature and amount of gas mixture entering the second or final portion of the catalyst mass are also controllable by a selective arrangement or system for by-passing the inflowing gas mixture partially or altogether from the heat-exchanger. Such method of temperature control allows not only a closer regulation of temperatures for the final catalytic operation with the maximum yield of product, but also permits less expensive construction than the internal system for cooling the catalyst heretofore used.

In carrying out my invention the catalyst mass is preferably separated into two or more separate portions and are preferably arranged in tandem within the catalytic furnace and coupled together with one or more sections of heat-interchangers also arranged in tandem so that all the inflowing or entering gas mixture may go either in series through the apparatus including the two or more separate portions of catalyst or, if desired, the entering gas mixture may be predeterminedly directed by separate connections and regulating cocks with the gas supply that all or any portion of the gas mixture may by-pass either (1) a part or all of the heat interchanger system; or (2) all or any portion of such gas mixture may by-pass all the heat-interchanger system and the first portion or section of the catalyst mass, while maintaining a continuous circulation of the gas mixture through both catalyst mass and heat-interchanger with a substantial uniformity of pressure during passage of the gas mixture from one portion to the next succeeding portion of the catalyst mass.

The accompanying drawing represents in vertical section an apparatus adapted for carrying out the process of my invention.

The catalyst furnace 1 is arranged in the upper part of the cylindrical vessel 2 having the top 3 and bottom 4 strong enough to withstand the high pressures employed. The furnace 1 is preferably divided into two parts by the perforated grate 5 which is preferably located somewhat above the middle of the furnace 1 to form the upper catalyst chamber 6 containing the catalyst substance 7, with the lower catalyst chamber 8 containing the major portion of the catalyst substance 9 resting on the perforated grate 10 forming the bottom of the furnace 1. As shown the arrangement of the two catalyst chambers 6 and 8 is preferably in tandem with the chamber 8 somewhat larger in content than the chamber 6 as will be hereinafter explained. The heat-interchanger 11 is preferably located below the catalyst furnace 1 as shown; such interchanger comprises two sections 12 and 13 also arranged in tandem, the head 14 of the section 12 having the pipe 15 connected therewith and extending upwardly through the furnace 1 and opening into the top of the chamber 6 above the catalyst 7. The sections 12 and 13 each comprises a series of vertically-disposed spaced-apart pipes 16 extending therethrough with the chamber 17 located between the two sections 12 and 13. The bottom of the section 13 is formed with the head 18 connected by the pipe 19 extending through the bottom 4 and connecting with the gas inlet pipe 20 communicating by the cock 21 with the source of the ingoing gas mixture flowing upwardly through the pipe 22. To by-pass and control the volume of the inflowing gas mixture from the pipe 22 to different portions of the apparatus, the pipe 23 having the cock 24 therein communicates with the chamber 17; also the pipe 25 having the cock 26 communicates with the head 14; while the upper end of the pipe 22 is connected with the pipe 27 leading to the upper part of the catalyst chamber 8, such pipe 27 having the cock 28 to control the flow of gas through the pipe 27. The top 3 is formed with the bore 29 connected with the gas outlet pipe 30. In the drawing the arrows with the solid lines indicate the path of the gas mixture going to and through the furnace 1, while the arrows with the broken lines show the path of the gas mixture after passing from the catalyst furnace.

When using the form of apparatus as illustrated, the procedure of controlling the direction and volume of ingoing gas mixture to different parts of the apparatus from the pipe 22 is determined by the selective manipulation of the several cocks 21, 24, 26 and 28. The essentials of the arrangement shown comprise the two separate portions of catalyst substance 7 and 9 with one or more sections 12 and 13 of the heat-interchanger set up in tandem so that all the inflowing gas mixture may go in series through all the equipment including the two catalyst portions 7 and 9, or if so desired, by means of the separate pipe connections and cocks connected with the gas inflow in the pipe 22, such inflowing gas may be so directed that all or any portion thereof may by-pass (*a*) a part or all of the heat-interchanger 11, or (*b*) the entire interchanger system and the catalyst chamber 6. The separate gas inlet connections through the pipes 20, 23, 25 and 27, each with its suitable cock, also permit the gas to enter the interchanger 11 at one or more points, as well as to the two catalyst chambers 6 and 8.

One advantage of having the upper and initially-contacted catalyst 7 of less content than the final catalyst 9, is that the temperature in the larger portion 9 of the catalyst mass may be held closely to the optimum, since the greater part of the heat reaction is liberated in the chamber 6 throughout the catalyst 7. Furthermore the temperature in the catalyst mass 7 may also be controlled partly by by-passing part of the heat-interchanger surface and partly by transfer of heat from the catalyst mass to the incoming gas. The temperature of the catalyst 9 in the chamber 8 may also be controlled by the admixture of cooler gas to the gas leaving the upper catalyst 7, and the temperature of gas entering the final catalyst 9 is also controllable by the selective arrangement for by-passing part or all of the interchanger system 11.

Neither the size, shape or arrangement of the heat-interchanger and catalyst chambers are essential; a convenient form, as shown, locates the interchanger in the lower part of the containing cylindrical vessel 2 with two separate catalyst bodies in series above the interchangers and within the same vessel 2. The gas mixture introduced into the circulating system as hereinbefore described refers to the unheated nitrogen hydrogen mixture having some ammonia therein that is passed into the circulating gas flow before reaching the catalyst or any part thereof.

I wish it to be understood that the invention is not to be confined to the method shown for effecting the improvements, as such method may be varied in many ways without departing from the nature of the invention and without sacrificing its chief advantages.

I claim as my invention:

1. The process of producing ammonia by passing a gaseous mixture of nitrogen and hydrogen over a catalyst mass at high temperatures under pressures below 400 atmospheres which comprises first passing nitrogen hydrogen mixture through a separated portion of the catalyst mass, then introducing cooler nitrogen hydrogen mixture to the outflowing mixture and thereafter passing the combined gas flow mixture through another separated portion of the catalyst of greater content than said first-mentioned portion with a substantial uniformity of pressure maintained throughout said passage through said portions of the catalyst.

2. The process of producing ammonia by passing a gaseous mixture of nitrogen and hydrogen over a catalyst mass at high temperatures under pressures below 400 atmospheres which comprises first passing preheated nitrogen hydrogen mixture through a separated portion of the catalyst mass, then introducing cooler nitrogen hydrogen mixture to the outflowing mixture and thereafter passing the combined gas flow mixture through another separated portion of the catalyst of greater content than said first-mentioned portion with a substantial uniformity of pressure maintained throughout said passage through said portions of the catalyst.

3. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing additional, comparatively cooler nitrogen hydrogen mixture to the reacted gas flow from said portion in controllable amounts and passing the combined flow through other spaced-apart portions of the catalyst for further reaction while maintaining a continuous circulation therethrough.

4. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing additional comparatively cooler nitrogen hydrogen mixture at a substantial uniformity of pressure to the reacted gas flow from said portion in controllable amounts and passing the combined flow through other spaced-apart portions of the catalyst for further reaction while maintaining a continuous circulation therethrough.

5. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing variable quantities of comparatively cooler nitrogen hydrogen mixture to the reacted gas flow from said portion in controllable amounts and passing the combined flow through other spaced-apart portions of the catalyst for further reaction while maintaining a continuous circulation therethrough.

6. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing variable quantities of comparatively cooler nitrogen hydrogen mixture at a substantial uniformity of pressure to the reacted gas flow from said portion in controllable amounts and passing the combined flow through other spaced-apart portions of the catalyst for further reaction while maintaining a continuous circulation therethrough.

7. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing additional comparatively cooler nitrogen hydrogen mixture to the reacted gas flow from said portion in controllable amounts and passing the combined flow through other spaced-apart portions of the catalyst for further reaction while maintaining a continuous circulation therethrough and a substantial uniformity of pressure during the passage of said gas mixture successively through said spaced-apart portions of the catalyst mass.

8. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing variable quantities of comparatively cooler nitrogen hydrogen mixture to the reacted gas flow from said portion in controllable amounts and passing the combined flow through other spaced-apart portions of the catalyst for further reaction while maintaining a continuous circulation therethrough and a substantial uniformity of pressure during the passage of said gas mixtures successively through said spaced-apart portions of the catalyst mass.

9. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing additional comparatively cooler nitrogen hydrogen mixture to the reacted gas flow from said portion in controllable amounts and passing the combined flow through other spaced-apart portions of the catalyst for further reaction, said controllable amounts being brought indirectly into contact with said spaced-apart portions of the catalyst, while maintaining a continuous circulation therethrough.

10. In the process of producing ammonia by passing a gaseous mixture of nitrogen and hydrogen over a catalyst mass at high temperature under pressure below 400 atmospheres, the steps which comprise passing the gas mixture into direct reaction contact with a portion of the catalyst mass, and then introducing variable quantities of comparatively cooler nitrogen hydrogen mixture to the reacted gas flow from said portion in controllable amounts and passing the combined flow through other spaced-apart portions of the catalyst for further reaction, said controllable amounts being brought indirectly into contact with said spaced-apart portions of the catalyst, while maintaining a continuous circulation therethrough.

11. In a method of conducting a gaseous catalytic synthesis under conditions of high temperature and pressure, the step which comprises introducing make-up gas to a catalyst mass, then introducing cooler make-up gas to the gas outflowing from the said catalyst mass, and thereafter flowing this mixture through a second and separated catalyst mass greater in extent than the former, while maintaining a continuous circulation therethrough.

RALPH S. RICHARDSON.